US012689931B2

(12) United States Patent
Tao

(10) Patent No.: US 12,689,931 B2
(45) Date of Patent: Jul. 21, 2026

(54) SCHEDULING METHOD, SCHEDULING APPARATUS, AND STORAGE MEDIUM

(71) Applicant: BEIJING XIAOMI MOBILE SOFTWARE CO., LTD., Beijing (CN)

(72) Inventor: Xuhua Tao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 275 days.

(21) Appl. No.: 18/691,370

(22) PCT Filed: Sep. 16, 2021

(86) PCT No.: PCT/CN2021/118685
§ 371 (c)(1),
(2) Date: Mar. 12, 2024

(87) PCT Pub. No.: WO2023/039785
PCT Pub. Date: Mar. 23, 2023

(65) Prior Publication Data
US 2024/0381154 A1     Nov. 14, 2024

(51) Int. Cl.
*H04W 24/10* (2009.01)
*H04W 72/21* (2023.01)
*H04W 72/23* (2023.01)

(52) U.S. Cl.
CPC ........... *H04W 24/10* (2013.01); *H04W 72/21* (2023.01); *H04W 72/23* (2023.01)

(58) Field of Classification Search
CPC ..... H04W 24/10; H04W 72/21; H04W 72/23; H04W 36/0088
See application file for complete search history.

(56) References Cited

U.S. PATENT DOCUMENTS

| | | | | |
|---|---|---|---|---|
| 2015/0327104 A1* | 11/2015 | Yiu | ................... | H04W 36/0088 |
| | | | | 455/450 |
| 2018/0227785 A1 | 8/2018 | Yiu et al. | | |
| 2019/0373497 A1* | 12/2019 | Cui | ................... | H04W 72/1268 |

FOREIGN PATENT DOCUMENTS

| | | |
|---|---|---|
| CN | 109788497 A | 5/2019 |
| CN | 110740050 A | 1/2020 |
| CN | 111918303 A | 11/2020 |
| CN | 112399460 A | 2/2021 |

OTHER PUBLICATIONS

PCT/CN2021/118685 International Search Report dated Jun. 17, 2022, 2 pages.
Intel Corporation et al. "Outcome of RAN WG1 E-mail Discussion [102-e-Post-NR-ePos-01]" 3GPP TSG RAN WG1 Meeting #102-E, R1-2007486, Aug. 2020, 325 pages.
Chinese Patent Application No. 202180002887.6, Office Action with English translation dated Jul. 23, 2025, 21 pages.
European Patent Application No. 21957073.6, Search and Opinion dated Jun. 4, 2025, 11 pages.

* cited by examiner

*Primary Examiner* — Dady Chery
(74) *Attorney, Agent, or Firm* — Cozen O'Connor

(57) ABSTRACT
A scheduling method, performed by a terminal includes: determining a measurement object for which a mobility measurement is performed; and, scheduling, based on the measurement object, a measurement gap pattern corresponding to the measurement object among a plurality of measurement gap patterns for performing the mobility measurement.

16 Claims, 5 Drawing Sheets network device terminal                    terminal

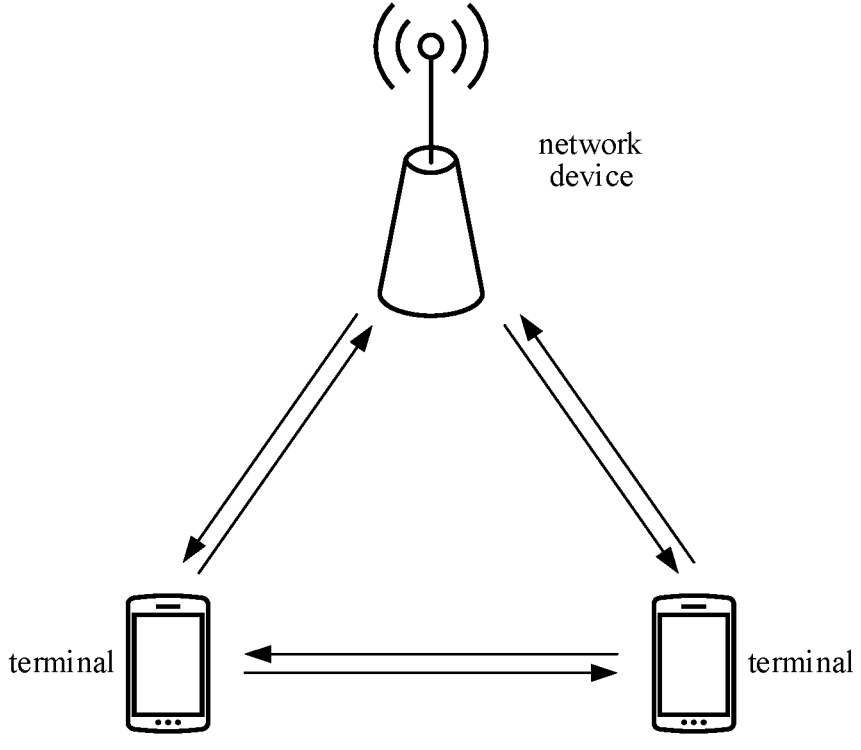

network
device terminal                                              terminal

FIG. 1

| determining a measurement object for which a mobility measurement is performed | S11 |

| scheduling, based on the measurement object, a measurement gap pattern corresponding to the measurement object among a plurality of measurement gap patterns used for performing the mobility measurement | S12 |

FIG. 2

| transmitting request information based on UCI | S21 |

FIG. 3

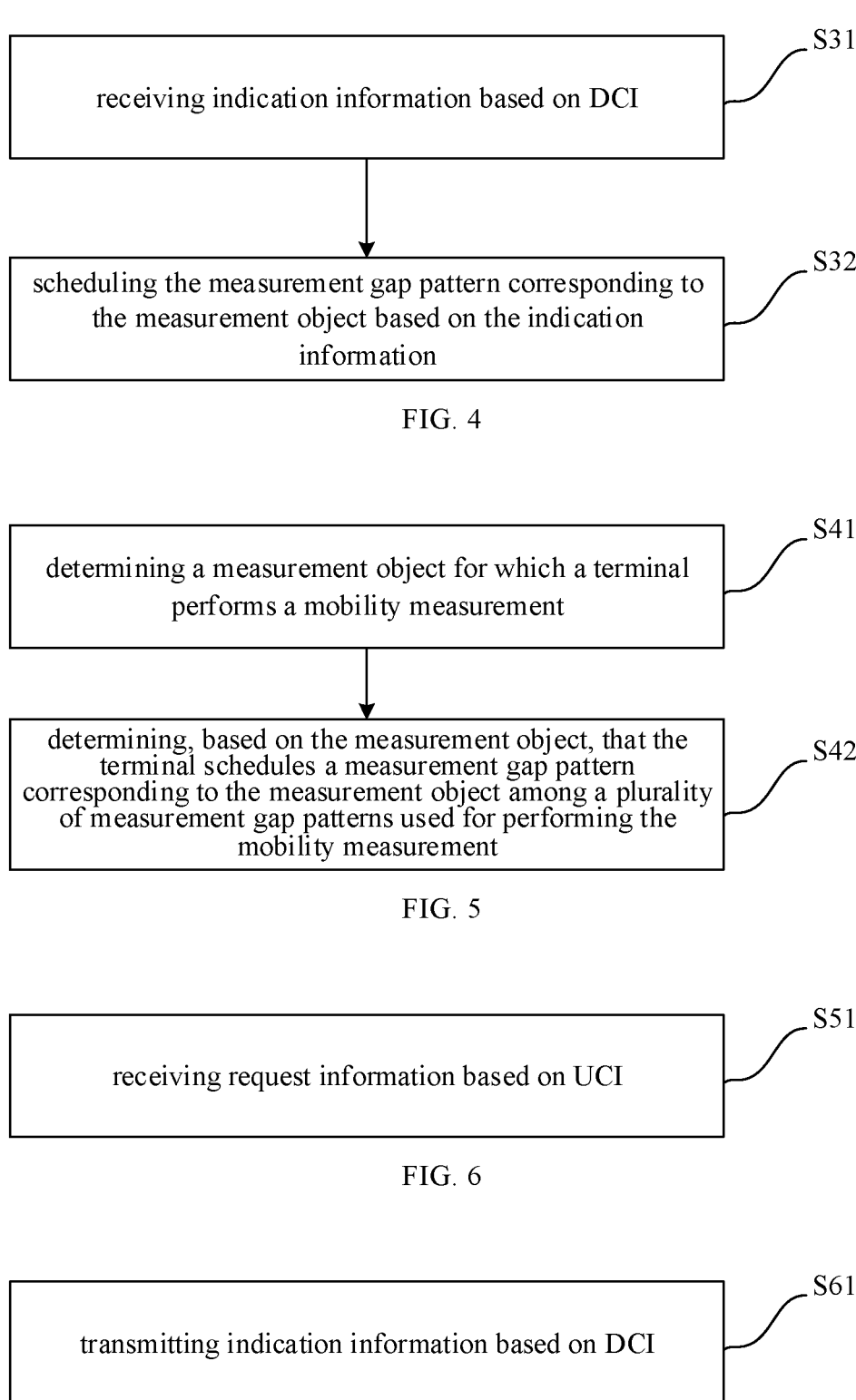

receiving indication information based on DCI ⟋ S31 scheduling the measurement gap pattern corresponding to the measurement object based on the indication information ⟋ S32

FIG. 4 determining a measurement object for which a terminal performs a mobility measurement ⟋ S41 determining, based on the measurement object, that the terminal schedules a measurement gap pattern corresponding to the measurement object among a plurality of measurement gap patterns used for performing the mobility measurement ⟋ S42

FIG. 5 receiving request information based on UCI ⟋ S51

FIG. 6 transmitting indication information based on DCI ⟋ S61

101 processing module

200

201 processing module

400

SCHEDULING METHOD, SCHEDULING APPARATUS, AND STORAGE MEDIUM

CROSS REFERENCE TO RELATED APPLICATIONS

This application is a U.S. national phase application of International Application No. PCT/CN2021/118685, filed on Sep. 16, 2021, the entire contents of which are incorporated herein by reference.

TECHNICAL FIELD

The disclosure relates to the field of wireless communication technology, more particularly, to a scheduling method, a scheduling apparatus, and a storage medium.

BACKGROUND

In a New Radio (NR) wireless communication system, when performing a mobility measurement, a network device configures a measurement gap for a terminal to perform the mobility measurement. However, when the terminal performs a reference signal measurement in the mobility measurement, the terminal may or may not need to perform the measurement of the reference signal for a period of time.

SUMMARY

According to a first aspect of embodiments of the disclosure, a scheduling method, performed by a terminal, is provided. The method includes:

determining a measurement object for which a mobility measurement is performed; and scheduling, based on the measurement object, a measurement gap pattern corresponding to the measurement object among a plurality of measurement gap patterns used for performing the mobility measurement.

According to a second aspect of embodiments of the disclosure, a scheduling method, performed by a network device, is provided. The method includes:

determining a measurement object for which a terminal performs a mobility measurement; and determining, based on the measurement object, that the terminal schedules a measurement gap pattern corresponding to the measurement object among a plurality of measurement gap patterns used for performing the mobility measurement.

According to a third aspect of embodiments of the disclosure, a scheduling device is provided. The scheduling device includes:

a processor; and a memory for storing instructions executable by the processor. The processor is configured to perform the scheduling method according to the first aspect or any implementation in the first aspect, or perform the scheduling method according to the second aspect or any implementation in the second aspect.

It should be understood that the above general description and the following detailed descriptions are exemplary and explanatory only and do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1 is a structural diagram of a communication system of a network device and a terminal according to an embodiment of the disclosure.

FIG. 2 is a flowchart of a scheduling method according to an embodiment of the disclosure.

FIG. 3 is a flowchart of a scheduling method according to another embodiment of the disclosure.

FIG. 4 is a flowchart of a scheduling method according to another embodiment of the disclosure.

FIG. 5 is a flowchart of a scheduling method according to another embodiment of the disclosure.

FIG. 6 is a flowchart of a scheduling method according to another embodiment of the disclosure.

FIG. 7 is a flowchart of a scheduling method according to another embodiment of the disclosure.

DETAILED DESCRIPTION

Figure 8:
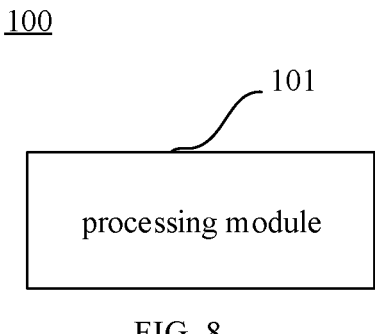
FIG. 8 is a block diagram of a scheduling apparatus according to an embodiment of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects of the disclosure as recited in the appended claims.

FIG. 1 is a structural diagram of a communication system of a network device and a terminal according to an embodiment of the disclosure. A communication method provided by this disclosure may be used in the architecture of the communication system shown in FIG. 1. As shown in FIG. 1, the network-side device can transmit signaling based on the architecture shown in FIG. 1.

It is understood that the communication system of the network device and the terminal shown in FIG. 1 is only for schematic illustration, and a wireless communication system may also include other network devices, such as a core network device, a wireless relay device and a wireless backhaul device, which are not shown in FIG. 1. The number of network devices and the number of terminals included in the wireless communication system are not limited in the embodiments of the disclosure.

It is further understood that the wireless communication system of the embodiments of the disclosure is a network that provides a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance (CSMS/CA). Depending on factors such as capacity, rate, and delay of different networks, the networks can be classified as a second Generation (2G) network, a 3G network, a 4G network, or a future evolved network, such as a 5G network, which can also be called a new radio (NR) network. For easy of description, in this disclosure, sometimes the wireless communication network may referred to as a network for short.

The network device involved in the disclosure may also be referred to as a radio access network device. The radio access network device may be: a base station, an evolved base station (evolved node B, i.e., eNB), a femtocell, an access point (AP) in a wireless fidelity (WI-FI) system, a radio relay node, a radio backhaul node, a transmission point (TP) or a transmission and reception point (TRP), a gNB in an NR system, or components or a part of the devices that constitute the base station. The network device may also be a vehicle-mounted device in a vehicle to everything (V2X) communication system. It should be understood that the specific technology and the specific device form used by the network device are not limited in the embodiments of the disclosure.

The terminal involved in the disclosure may also be referred to as a terminal device, user equipment (UE), a mobile station (MS), or a mobile terminal (MT), which is a device that provides voice and/or data connectivity to a user. For example, the terminal can be a handheld device or a vehicle-mounted device with a wireless connectivity function. For example, currently, the terminals include a mobile phone, a pocket personal computer (PPC), a handheld computer, a personal digital assistant (PDA), a laptop, a tablet computer, a wearable device, or a vehicle-mounted device, etc. In addition, the terminal device may also be a vehicle-mounted device in the V2X communication system. It should be understood that the specific technology and the specific device form used by the terminal are not limited in the embodiments of this disclosure.

In a New Radio (NR) system, when a terminal uses a measurement gap to perform a mobility measurement, a network device configure a measurement gap through Radio Resource Control (RRC) configuration or reconfiguration. However, when the terminal performs a reference signal measurement, the terminal may need to perform the measurement of the reference signal for a period of time, and may not need to perform the measurement of the reference signal for another period of time, such as when measuring the Positioning reference signaling (PRS) or the Channel State Information Reference Signal (CSI-RS). When measuring the PRS or the CSI-RS, the terminal may need to perform the measurement for a period of time and may not need to perform the measurement for a period of time. However, the terminal can only perform the measurement based on the measurement gap configured by the network device, or no measurement gap is configured the network. The terminal cannot dynamically activate or deactivate the measurement gap.

Based on this, the disclosure provides a scheduling method, in which a terminal can request, according to a measurement situation, a network device to schedule a measurement gap, and the network device can instruct, according to demands, the terminal to activate or deactivate a measurement gap. A measurement gap determined to be used does not need to be configured or reconfigured by the network device, thus improving a measurement efficiency and reducing the measurement latency.

Following embodiments will illustrate the scheduling method.

FIG. 2 is a flowchart of a scheduling method according to an embodiment of the disclosure. As shown in FIG. 2, the method is performed by a terminal, and includes the following steps.

In step S11, a measurement object for which a mobility measurement is performed is determined.

In step S12, based on the measurement object, a measurement gap pattern corresponding to the measurement object is scheduled among a plurality of measurement gap patterns used for performing the mobility measurement.

In embodiments of the disclosure, different measurement objects require different measurement gap patterns. When performing the mobility measurement, the terminal may determine the measurement object and determine a measurement gap pattern to be scheduled based on the measurement object.

In multiple configured gap patterns, the measurement gap pattern corresponding to the measurement object is scheduled.

With the scheduling method provided in this disclosure, it realizes that the terminal schedules required or unnecessary measurement gaps in a way of activation or deactivation, thereby effectively improving measurement efficiency of the terminal and reducing measurement latency.

In embodiments of the disclosure, all measurement gap patterns required for performing the mobility measurement can be configured for the terminal, and different measurement gap patterns correspond to different measurement objects. With reference to Table 1, which includes Gap Pattern ID (GPID), Measurement Gap Length (MGL), and Measurement Gap Repetition Period (MGRP).

TABLE 1

| Measurement Gap Pattern GPID | Measurement Gap Length MGL (ms) | Measurement Gap Repetition Period MGRP (ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 80 |
| 25 | 20 | 160 |

It can be understood that the elements in Table 1 include the measurement gap pattern, the measurement gap length, and the measurement gap repetition period, where each element exists independently. These elements are exemplarily listed in the same table, but it does not mean that all elements in the table must exist simultaneously as shown in the table. In other words, the measurement gap pattern, the measurement gap length, and the measurement gap repetition period can exist independently. The value of each element is independent of any other element values in Table 1. For example, a value of the measurement gap length is not determined based on an index of the measurement gap pattern or the measurement gap repetition period. Therefore, those skilled in the art can understand that the value of each element in Table 1 is an independent embodiment.

Different measurement gap patterns are used to measure different reference signals. The reference signal (RS) may be a synchronization signal block (SSB), a CSI-RS, a PRS, and other signals. For example, GPID #i is used to measure RS #i, and a measurement period length I (ms) and a measurement gap repetition period I (ms) for measuring RS #i are determined based on the GPID index i.

GPID #j is used to measure RS #j, and a measurement period length J (ms) and a measurement gap repetition period J (ms) for measuring RS #j are determined based on the GPID index j.

In embodiments of the disclosure, bit positions may be used to indicate different indexes and a scheduling status of a measurement gap pattern for measuring a reference signal.

In some embodiments the disclosure, the terminal may request a scheduled measurement gap pattern from the network device based on the measurement object during the mobility measurement, and the steps of which can be referred to FIG. 3. FIG. 3 is a flowchart of a scheduling method according to an embodiment of the disclosure. As shown in FIG. 3, the scheduling method is performed by a terminal and includes the following steps.

In step S21, request information is transmitted based on Uplink Control Information (UCI).

In embodiments of the disclosure, the terminal determines a measurement gap pattern required by the measurement object, and transmits the request information to the network device based on the UCI, requesting scheduling the measurement gap pattern corresponding to the measurement object. That is, the terminal can introduce dynamic indication information about requiring/not requiring a measurement gap through the UCI signaling.

In embodiments of the disclosure, the request information includes a bit for indicating an index of the measurement gap pattern corresponding to the measurement object, and a bit for indicating a scheduling status of the measurement gap pattern. For example, the indexes included in Table 1 can be represented based on a certain number of bits, such as using 5 bits to represent a value of the index, and using 1 bit to represent the scheduling status of the requested measurement gap pattern.

In an exemplary embodiment of the disclosure, if the indexes in the table above are used to indicate the requested measurement gap pattern, a first number of bits can be determined in the request information. The index of the measurement gap pattern corresponding to the measurement object can be indicated based on a portion of the first number of bits, and the scheduling status of the measurement gap pattern can be indicated based on the remaining portion of the first number of bits.

In embodiments of the disclosure, the terminal requesting the network device to schedule a measurement gap pattern corresponding to the measurement object may refer to requesting to activate the measurement gap pattern, or requesting deactivate the measurement gap pattern.

For example, there are 5 bits used to indicate the index in the first number of bits, and there is one bit used to indicate the scheduling status of the measurement gap pattern. For 5 bits, 00000 represents index 0, 00001 represents index 1, and so on. The value 1 of the last bit indicates requesting activation, while the 0 of the last bit indicates requesting deactivation. It can also be that 0 represents requesting activation, and 1 represents requesting deactivation, which is not limited here.

In some embodiments of the disclosure, the network device may indicate a scheduled measurement gap pattern to the terminal based on the measurement object during the execution of mobility measurement of the terminal. The steps can be referred to in FIG. 4. FIG. 4 is a flowchart of a scheduling method according to an embodiment of the disclosure. As shown in FIG. 4, the scheduling method is performed by a terminal, including the following steps.

In step S31, indication information is received based on downlink control information (DCI).

In step S32, the measurement gap pattern corresponding to the measurement object is scheduled based on the indication information.

In embodiments of the disclosure, if the terminal receives the indication information transmitted by the network device, it is determined that an indication of dynamically scheduling the measurement gap pattern is introduced into the indication information. The measurement gap pattern corresponding to the measurement object is scheduled based on the indication of dynamically scheduling the measurement gap pattern.

In embodiments of the disclosure, the indication information includes a bit for indicating an index of the measurement gap pattern corresponding to the measurement object, and a bit for indicating a scheduling status of the measurement gap pattern. The indexes included in Table 1 can be represented based on a certain number of bits, for example, using 5 bits to represent a value of the index, and using 1 bit to represent a state of the requested measurement gap pattern.

As mentioned above, in an exemplary embodiment of the disclosure, if the indexes in the table above are used to indicate the requested measurement gap pattern, the first number of bits can be determined in the request information, The index of the measurement gap pattern corresponding to the measurement object can be indicated based on a portion of the first number of bits, and the scheduling status of the measurement gap pattern can be indicated based on the remaining portion of the first number of bits.

In embodiments of the disclosure, the network device indicates the terminal to schedule the measurement gap pattern corresponding to and the measurement object. Indicating the terminal to scheduling the measurement gap pattern corresponding to the measurement object can be indicating the terminal to activate the measurement gap pattern or indicating the terminal to deactivate the measurement gap pattern.

For example, in the first 5 bits, 00000 represents index 0, 00001 represents index 1, and so on. The last bit being 1 indicates requesting activation, while being 0 indicates requesting deactivation. It can also be that 0 represents requesting activation, and 1 represents requesting deactivation, which is not limited here.

In embodiments of the disclosure, the plurality of measurement gap patterns used for performing the mobility measurement can be determined based on a measurement gap configuration (measGap Config) signaling.

Based on the same/similar idea, embodiments of the disclosure further provide a scheduling method.

FIG. 5 is a flowchart of a scheduling method according to an embodiment of the disclosure. As shown in FIG. 5, the method is performed by a network device, and includes the following steps.

In step S41, a measurement object for which a terminal performs a mobility measurement is determined.

In step S42, based on the measurement object, it is determined that the terminal schedules a measurement gap pattern corresponding to the measurement object among a plurality of measurement gap patterns used for performing the mobility measurement.

In embodiments of the disclosure, different measurement objects require different measurement gap patterns. When performing the mobility measurement, the terminal may determine the measurement object and determine a measurement gap pattern to be scheduled based on the measurement object.

In multiple configured gap patterns, it is determined that the terminal schedules the measurement gap pattern corresponding to the measurement object.

With the scheduling method provided in this disclosure, it realizes that the network device indicates the terminal to schedule required or unnecessary measurement gaps in a way of activation or deactivation, thereby effectively improving measurement efficiency of the network device and reducing measurement latency.

In embodiments of the disclosure, all measurement gap patterns required for performing the mobility measurement can be configured for the terminal, and different measurement gap patterns correspond to different measurement objects, which may refer to Table 1 in the above embodiments.

In some embodiments of the disclosure, the terminal may request a scheduled measurement gap pattern from the network device based on the measurement object during the mobility measurement. The network device indicates the terminal to schedule the measurement gap pattern corresponding to the measurement object based on received request information. The steps can be referred to FIG. 6. FIG. 6 is a flowchart of a scheduling method according to an embodiment of the disclosure. As shown in FIG. 6, the scheduling method is performed by the network device and includes the following steps.

In step S51, request information is received based on UCI.

In embodiments of the disclosure, the network device determines a measurement gap pattern required by the measurement at the terminal based on the received request information. That is, the measurement gap pattern needed by the terminal is determined according to dynamic indication information about needing/not needing a measurement gap introduced through the UCI signaling.

In embodiments of the disclosure, the request information includes a bit for indicating an index of the measurement gap pattern corresponding to the measurement object, and a bit for indicating the scheduling status of the measurement gap pattern. For example, the indexes included in Table 1 can be represented based on a certain number of bit bits, such as using 5 bit bits to represent a value of the index, and using 1 bit to represent the scheduling status of the requested measurement gap pattern.

In an exemplary embodiment of the disclosure, if the indexes in the table above are used to indicate the requested measurement gap pattern, a first number of bits can be determined in the request information. The index of the measurement gap pattern corresponding to the measurement object can be determined based on a portion of the first number of bits. The scheduling status of the measurement gap pattern can be indicated based on the remaining portion of the first number of bits.

In embodiments of the disclosure, the terminal requests the network device to schedule a measurement gap pattern corresponding to the measurement object. It requests the network device to schedule the measurement gap pattern through the bit in the transmitted request information. If the reference signal measured by the terminal needs to perform the mobility measurement, the terminal requests to activate the measurement gap pattern corresponding to the measurement object based on the bit. If the reference signal measured by the terminal does not require the mobility measurement, the terminal requests to deactivate the measurement gap pattern corresponding to the measurement object based on the bit.

For example, in the first 5 bits, 00000 represents index 0, 00001 represents index 1, and so on. For example, an index contained in the request information is determined to be 1 based on the bit position, then the measurement gap length and the measurement gap repetition period corresponding to the index 1 are determined. If the bit used to indicate the scheduling status is 1, it represents indicating the terminal to activate the measurement gap pattern corresponding to the measurement object. If the bit used to indicate the scheduling status is 0, it represents indicating the terminal to deactivate the measurement gap pattern corresponding to the measurement object. It can also be that, 0 represents indicating the terminal to activate the measurement gap pattern corresponding to the measurement object, and 1 represents indicating the terminal to deactivate the measurement gap pattern corresponding to the measurement object, which is not limited here.

In some embodiments of the disclosure, the network device may indicate a scheduled measurement gap pattern to the terminal based on the measurement object during the execution of mobility measurement of the terminal. The steps can be referred to FIG. 7. FIG. 7 is a flowchart of a scheduling method according to an embodiment of the disclosure. As shown in FIG. 7, the scheduling method is performed by the network device and includes the following steps.

In step S61, indication information is transmitted based on DCI.

The indication information transmitted by the network device is used to instruct the terminal to schedule a measurement gap pattern corresponding to the measurement object.

In embodiments of the disclosure, if the terminal receives the indication information transmitted by the network device, it is determined that an indication of dynamically scheduling the measurement gap pattern is introduced into the indication information. The measurement gap pattern corresponding to the measurement object is scheduled based on the indication of dynamically scheduling the measurement gap pattern.

In embodiments of the disclosure, the indication information includes a bit for indicating an index of the measurement gap pattern corresponding to the measurement object, and a bit for indicating a scheduling status of the measurement gap pattern.

The indexes included in Table 1 can be indicated based on a certain number of bits, such as using 5 bits to indicate a value of the index, and using 1 bit to indicate the scheduling status of the requested measurement gap pattern.

In an exemplary embodiment of the disclosure, if the indexes in the table above are used to indicate the measurement gap pattern of the terminal, a first number of bits can be determined in the indication information. The index of the measurement gap pattern corresponding to the measurement object can be indicated based on a portion of the first number of bits, and the scheduling status of the measurement gap pattern can be indicated based on the remaining portion of the first number of bits.

In embodiments of the disclosure, the network device instructs the terminal to schedule the measurement gap pattern corresponding to the measurement object. The measurement gap pattern scheduled by the terminal is indicated through the bit in the transmitted indication information. If the reference signal measured by the terminal needs to perform the mobility measurement, the terminal is indicated to activate the measurement gap pattern corresponding to the measurement object based on the bit. If the reference signal measured by the terminal does not require the mobility measurement, the terminal is indicated to deactivate the measurement gap pattern corresponding to the measurement object based on the bit.

For example, in the first 5 bits, 00000 represents index 0, 0000 1 represents index 1, and so on. For example, an index contained in the request information is determined to be 1 based on the bit position, then the measurement gap length and the measurement gap repetition period corresponding to the index 1 are determined. If the bit used to indicate the scheduling status is 1, it represents indicating the terminal to activate the measurement gap pattern corresponding to the measurement object. If the bit used to indicate the scheduling status is 0, it represents indicating the terminal to deactivate the measurement gap pattern corresponding to the measurement object. It can also be that, 0 represents indicating the terminal to activate the measurement gap pattern corresponding to the measurement object, and 1 represents indicating the terminal to deactivate the measurement gap pattern corresponding to the measurement object, which is not limited here.

In embodiments of the disclosure, the plurality of measurement gap patterns used for performing the mobility measurement can be determined based on a measurement gap configuration (measGap Config) signaling.

Based on the same/similar idea, embodiments of the disclosure further provide a scheduling apparatus.

It is understood that the scheduling apparatus provided by the embodiments of the disclosure includes hardware structures and/or software modules for performing respective functions in order to achieve the above functions. In combination with the units and algorithmic steps of the various examples disclosed in the embodiments of the disclosure, the embodiments of the disclosure can be implemented in the form of hardware or a combination of hardware and computer software. Whether a particular function is performed by hardware or by a way of driving hardware by computer software depends on the particular application and design constraints of the technical solution. Those skilled in the art may use different methods for each particular application to implement the described functions, but such implementation should not be considered as beyond the scope of the technical solutions of the embodiments of the disclosure.

FIG. 8 is a block diagram of a scheduling apparatus according to an embodiment of the disclosure. As shown in FIG. 8, the scheduling apparatus 100, applied to a terminal, may include a processing module 101.

The processing module 101 is configured to determine a measurement object for which a mobility measurement is performed. The processing module is further configured to schedule, based on the measurement object, a measurement gap pattern corresponding to the measurement object among a plurality of measurement gap patterns used for performing the mobility measurement.

In embodiments of the disclosure, different measurement gap patterns correspond to different measurement objects.

In embodiments of the disclosure, the processing module 101 is further configured to: transmit request information based on uplink control information (UCI), in which the request information is used to request a network device to schedule the measurement gap pattern corresponding to the measurement object.

In embodiments of the disclosure, the request information includes a bit for indicating an index of the measurement gap pattern corresponding to the measurement object, and a bit for indicating a scheduling status of the measurement gap pattern.

In embodiments of the disclosure, the processing module 101 is further configured to: request to activate the measurement gap pattern, or request to deactivate the measurement gap pattern.

In embodiments of the disclosure, the processing module 101 is further configured to: receive indication information based on downlink control information (DCI); and schedule the measurement gap pattern corresponding to the measurement object based on the indication information.

In embodiments of the disclosure, the indication information includes a bit for indicating an index of the measurement gap pattern corresponding to the measurement object, and a bit for indicating a scheduling status of the measurement gap pattern.

In embodiments of the disclosure, the processing module 101 is further configured to: activate the measurement gap pattern, or deactivate the measurement gap pattern.

In embodiments of the disclosure, the plurality of measurement gap patterns used for performing the mobility measurement are determined based on a measurement gap configuration signaling.

Figure 9:
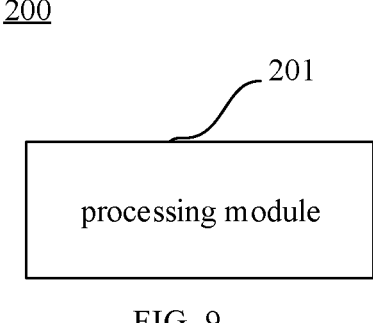
FIG. 9 is a block diagram of a scheduling apparatus according to another embodiment of the disclosure.

FIG. 9 is a block diagram of a scheduling apparatus according to an embodiment of the disclosure. As shown in FIG. 9, the scheduling apparatus 200, applied to a network device, may include a processing module 201.

The processing module 201 is configured to determine a measurement object for which a terminal performs a mobility measurement. The processing module is further configured to determine, based on the measurement object, that the terminal schedules a measurement gap pattern corresponding to the measurement object among a plurality of measurement gap patterns used for performing the mobility measurement.

In embodiments of the disclosure, different measurement gap patterns correspond to different measurement objects.

In embodiments of the disclosure, the processing module 201 is further configured to: receive request information based on uplink control information (UCI), in which the request information is used for the terminal to request to schedule the measurement gap pattern corresponding to the measurement object.

In embodiments of the disclosure, the request information includes a bit for indicating an index of the measurement gap pattern corresponding to the measurement object, and a bit for indicating a scheduling status of the measurement gap pattern.

In embodiments of the disclosure, the processing module 201 is further configured to: request to activate the measurement gap pattern, or request to deactivate the measurement gap pattern.

In embodiments of the disclosure, the processing module 201 is further configured to: transmit indication information based on downlink control information (DCI), the indication information indicating the terminal to schedule the measurement gap pattern corresponding to the measurement object.

In embodiments of the disclosure, the indication information includes a bit for indicating an index of the measurement gap pattern corresponding to the measurement object, and a bit for indicating a scheduling status of the measurement gap pattern.

In embodiments of the disclosure, the processing module 201 is further configured to: activate the measurement gap pattern, or deactivate the measurement gap pattern.

In embodiments of the disclosure, the plurality of measurement gap patterns used for performing the mobility measurement are determined based on a measurement gap configuration signaling.

With respect to the apparatus in the above embodiments, the specific manner in which each module performs an operation has been described in detail in the method embodiments, and will not be described in detail herein.

Figure 10:
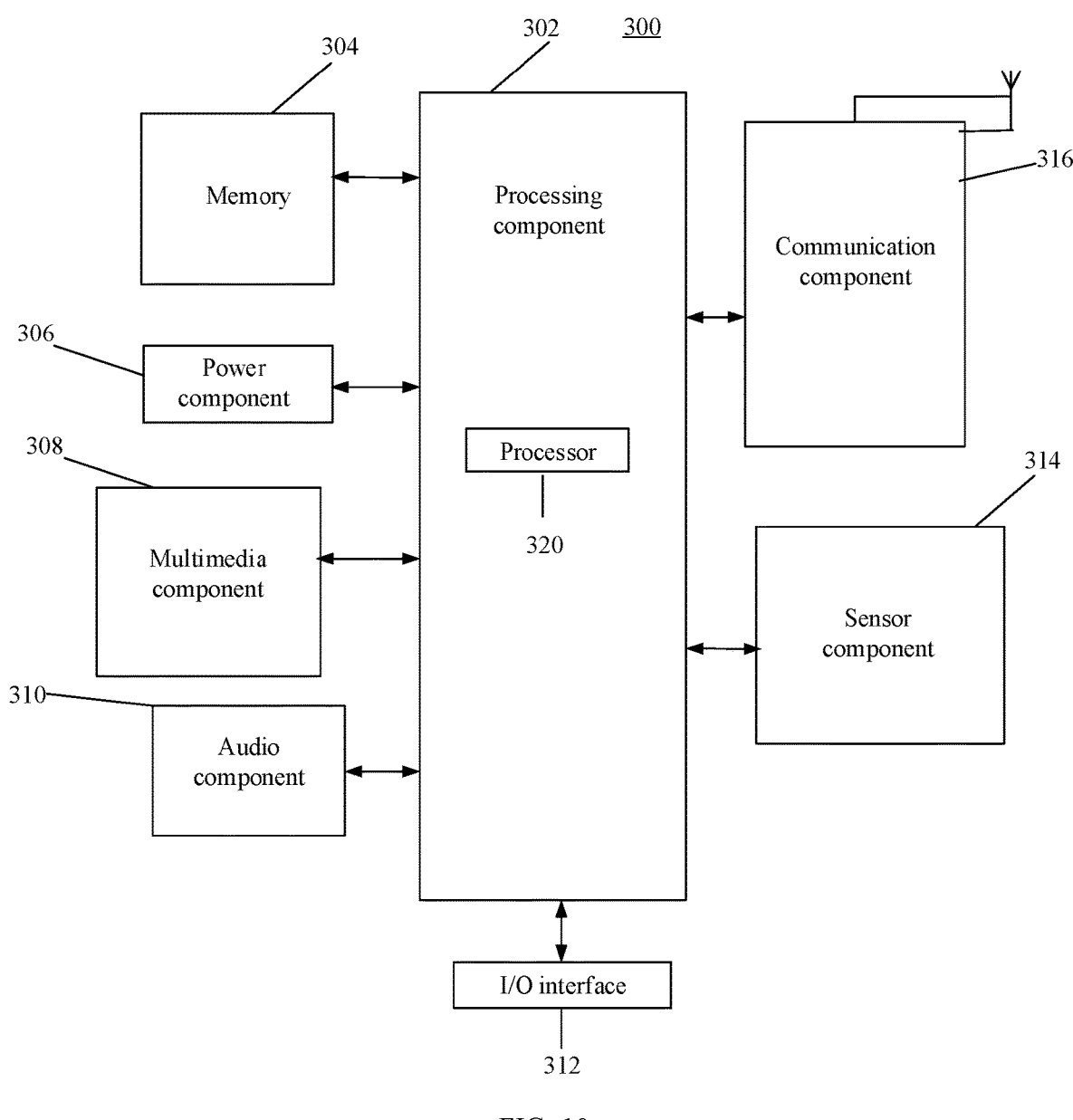
FIG. 10 is a block diagram of a device for scheduling according to an embodiment of the disclosure.

FIG. 10 is a block diagram of a device 300 for scheduling according to an embodiment of the disclosure. For example, the device 300 may be a mobile phone, a computer, a digital broadcasting terminal, a message transceiver device, a game console, a tablet device, a medical device, a fitness device and a PDA.

As illustrated in FIG. 10, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone call, data communication, camera operation, and recording operation. The processing component 302 may include one or more processors 320 to perform instructions to implement all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a calling mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of a user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a Complementary Metal Oxide Semiconductor (CMOS) or Charge-Coupled Device (CCD) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G, or 3G, or a combination thereof. In an exemplary embodiment, the communication component 316 receives a broadcast signal from an external broadcast management system or broadcast associated information via a broadcast channel. In an exemplary embodiment, the communication component 316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In the exemplary embodiments, there is also provided a non-transitory computer readable storage medium including instructions, such as the memory 304, executable by the processor 320 in the device 300, for implementing the above methods. For example, the non-transitory computer-readable storage medium may be a ROM, a Random Access Memory (RAM), a CD-ROM, a magnetic tape, a floppy disc, and an optical data storage device.

Figure 11:
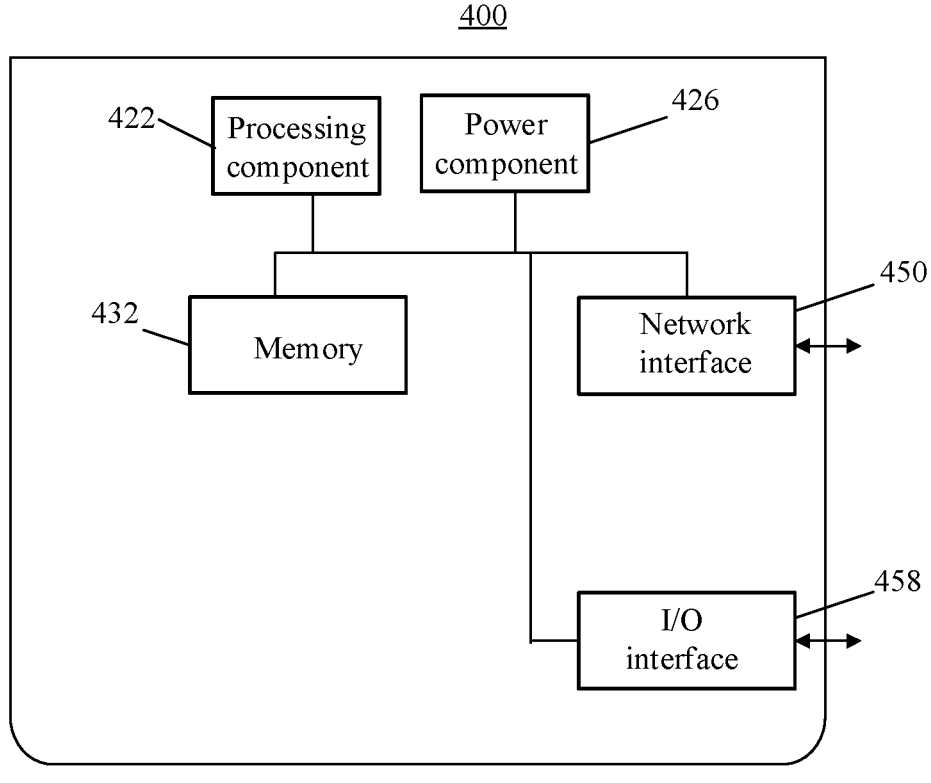
FIG. 11 is a block diagram of a device for scheduling according to another embodiment of the disclosure.

FIG. 11 is a block diagram of a device for scheduling according to another embodiment of the disclosure. For example, the device 400 may be provided as a server. As illustrated in FIG. 11, the device 400 includes a processing component 422 including one or more processors, and memory resources represented by a memory 432 for storing instructions that can be executed by the processing component 422, such as applications. The application programs stored in the memory 432 may include one or more modules each corresponding to a set of instructions. In addition, the processing component 422 is configured to execute the instructions to perform the methods described above.

The device 400 may also include a power component 426 configured to perform power management of the device 400, a wired or wireless network interface 450 configured to connect the device 400 to a network, and an I/O interface 458. The device 400 may operate on an operating system stored in the memory 432, such as Windows Server™, Mac OS X™, Unix™, Linux™, FreeBSD™, or the like.

The technical solutions provided by the embodiments of the disclosure may have the following beneficial effects. The terminal requests to schedule the measurement gap pattern corresponding to the measurement object, by dynamically scheduling the measurement gap, it is possible for the terminal to schedule required or unnecessary measurement gaps in a way of activation or deactivation, thereby effectively improving measurement efficiency of the terminal and reducing measurement latency.

It is further understood that the term "multiple" in the disclosure refers to two or more, which is the similar for other quantifiers. The term "and/or" describes a relation of associated objects, which indicates three relations, for example, "A and/or B" indicates that A exists alone, A and B both exist, and B exists alone. The character "/" generally indicates that the associated objects prior to and after the character "/" is an "or" relation. The terms "a", "said" and "the" in the singular form are also intended to include the plural form, unless the context clearly indicates otherwise.

It is further understood that the terms "first", "second", etc. are used to describe various types of information, but that such information should not be limited to these terms. These terms are used only to distinguish information of the same type from each another and do not indicate a particular order or degree of importance. In fact, the expressions "first" and "second" can be used interchangeably. For example, without departing from the scope of this disclosure, first information may also be referred to as second information, and similarly, second information may also be referred to as first information.

It is further understood that although the operations are depicted in the accompanying drawings in a particular order in the embodiments of the disclosure, this should not be construed as requiring that the operations be performed in the particular sequence shown or in a serial sequence, or that all of the operations shown be performed to obtain the desired results. Multitasking and parallel processing may be advantageous in particular environments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A scheduling method, performed by a terminal, comprising:

determining a measurement object for which a mobility measurement is performed; and scheduling, based on the measurement object, a measurement gap pattern corresponding to the measurement object among a plurality of measurement gap patterns used for performing the mobility measurement, wherein different measurement gap patterns are used to measure different reference signals;

wherein scheduling the measurement gap pattern corresponding to the measurement object comprises: transmitting request information, wherein the request information is used to request a network device to schedule the measurement gap pattern corresponding to the measurement object, the request information comprising a bit for indicating an index of the measurement gap pattern corresponding to the measurement object, and a bit for indicating a scheduling status of the measurement gap pattern, the scheduling status of the measurement gap pattern comprising activating or deactivating the measurement gap pattern corresponding to the measurement object.

2. The method of claim 1, wherein different measurement gap patterns correspond to different measurement objects.

3. The method of claim 1, wherein requesting the network device to schedule the measurement gap pattern corresponding to the measurement object comprises one of:

requesting to activate the measurement gap pattern; or requesting to deactivate the measurement gap pattern.

4. The method of claim 1, wherein scheduling the measurement gap pattern corresponding to the measurement object comprises:

receiving indication information based on downlink control information (DCI); and scheduling the measurement gap pattern corresponding to the measurement object based on the indication information.

5. The method of claim 4, wherein the indication information comprises a bit for indicating an index of the measurement gap pattern corresponding to the measurement object, and a bit for indicating a scheduling status of the measurement gap pattern.

6. The method of claim 4, wherein scheduling the measurement gap pattern corresponding to the measurement object comprises one of:

activating the measurement gap pattern; or deactivating the measurement gap pattern.

7. The method of claim 1, wherein the plurality of measurement gap patterns used for performing the mobility measurement are determined based on a measurement gap configuration signaling.

8. A scheduling method, performed by a network device, comprising:

determining a measurement object for which a terminal performs a mobility measurement; and determining, based on the measurement object, that the terminal schedules a measurement gap pattern corresponding to the measurement object among a plurality of measurement gap patterns used for performing the mobility measurement, wherein different measurement gap patterns are used to measure different reference signals;

wherein scheduling the measurement gap pattern corresponding to the measurement object comprises: receiving request information transmitted from the terminal, wherein the request information is used to request the network device to schedule the measurement gap pattern corresponding to the measurement object, the request information comprising a bit for indicating an index of the measurement gap pattern corresponding to the measurement object, and a bit for indicating a scheduling status of the measurement gap pattern, the scheduling status of the measurement gap pattern comprising activating or deactivating the measurement gap pattern corresponding to the measurement object.

9. The method of claim 8, wherein different measurement gap patterns correspond to different measurement objects.

10. The method of claim 8, wherein requesting to schedule the measurement gap pattern corresponding to the measurement object comprises one of:

requesting to activate the measurement gap pattern; or requesting to deactivate the measurement gap pattern.

11. The method of claim 8, wherein scheduling the measurement gap pattern corresponding to the measurement object comprises:

transmitting indication information based on downlink control information (DCI), the indication information indicating the terminal to schedule the measurement gap pattern corresponding to the measurement object.

12. The method of claim 11, wherein the indication information comprises a bit for indicating an index of the measurement gap pattern corresponding to the measurement object, and a bit for indicating a scheduling status of the measurement gap pattern.

13. The method of claim 11, wherein scheduling the measurement gap pattern corresponding to the measurement object comprises one of:

activating the measurement gap pattern; or deactivating the measurement gap pattern.

14. The method of claim 8, wherein the plurality of measurement gap patterns used for performing the mobility measurement are determined based on a measurement gap configuration signaling.

15. A scheduling device, comprising:

a processor; and a memory for storing instructions executable by the processor;

wherein the processor is configured to perform the scheduling method of claim 8.

16. A scheduling device, comprising:

a processor; and a memory for storing instructions executable by the processor;

wherein the processor is configured to:

determine a measurement object for which a mobility measurement is performed; and schedule, based on the measurement object, a measurement gap pattern corresponding to the measurement object among a plurality of measurement gap patterns used for performing the mobility measurement, wherein different measurement gap patterns are used to measure different reference signals;

wherein scheduling the measurement gap pattern corresponding to the measurement object comprises: transmitting request information, wherein the request information is used to request a network device to schedule the measurement gap pattern corresponding to the measurement object, the request information comprising a bit for indicating an index of the measurement gap pattern corresponding to the measurement object, and a bit for indicating a scheduling status of the measurement gap pattern, the scheduling status of the measurement gap pattern comprising activating or deactivating the measurement gap pattern corresponding to the measurement object.

* * * * *